US010710238B2

(12) United States Patent
Guo

(10) Patent No.: US 10,710,238 B2
(45) Date of Patent: Jul. 14, 2020

(54) MODULAR ROBOTIC SYSTEM AND ASSOCIATED METHOD OF AUTOMATICALLY DETERMINING CONFIGURATION AND CONTROL THEREFOR

(71) Applicant: INSIGHT SCIENTIFIC INTERNATIONAL (SHANGHAI) LTD., Shanghai, P.R. (CN)

(72) Inventor: Lin Guo, Los Altos, CA (US)

(73) Assignee: INSIGHT SCIENTIFIC INTERNATIONAL (SHANGHAI) LTD. (CN)

(*) Notice: Subject to any disclaimer, the term of this patent is extended or adjusted under 35 U.S.C. 154(b) by 0 days.

(21) Appl. No.: 16/286,485

(22) Filed: Feb. 26, 2019

(65) Prior Publication Data

US 2019/0262988 A1  Aug. 29, 2019

Related U.S. Application Data

(60) Provisional application No. 62/635,331, filed on Feb. 26, 2018.

(51) Int. Cl.
| | |
|---|---|
| *B25J 9/08* | (2006.01) |
| *G05B 99/00* | (2006.01) |
| *B25J 9/16* | (2006.01) |
| *B25J 13/08* | (2006.01) |

(52) U.S. Cl.
CPC ............... *B25J 9/08* (2013.01); *B25J 9/1674* (2013.01); *B25J 13/08* (2013.01); *G05B 99/00* (2013.01); *G05B 2219/40304* (2013.01)

(58) Field of Classification Search
None
See application file for complete search history.

(56) References Cited

U.S. PATENT DOCUMENTS

| | | | | |
|---|---|---|---|---|
| 4,608,525 | A * | 8/1986 | Mori | B23Q 1/34 700/248 |
| 5,355,743 | A | 10/1994 | Tesar | |
| 2003/0038607 | A1 | 2/2003 | Yim et al. | |
| 2010/0066038 | A1 | 3/2010 | Young et al. | |
| 2011/0077773 | A1 | 3/2011 | Yu et al. | |
| 2012/0122059 | A1 | 5/2012 | Schweikardt et al. | |
| 2017/0136620 | A1* | 5/2017 | Hardouin | B25J 9/0003 |
| 2017/0274294 | A1* | 9/2017 | Liu | A63H 33/042 |
| 2017/0368679 | A1* | 12/2017 | Jenett | B64G 1/244 |

OTHER PUBLICATIONS

International Search Report, Application No. PCT/US2019/019670, dated May 1, 2019, pp. 1-9.

* cited by examiner

*Primary Examiner* — Bentsu Ro
(74) *Attorney, Agent, or Firm* — Innovation Counsel LLP

(57) ABSTRACT

Modular building blocks for building a robotic system, and the method of building the robotic system using the building blocks, are presented. The building block includes a chassis having a first end and a second end, a first connector positioned closer to the second end than the first end of the chassis, either a second connector or a rotational actuator positioned closer to the first end than the second end of the chassis and configured to couple with the first connector, a signal interface on a surface of the chassis, the signal interface including hardware and circuitry for transferring and receiving signals from and to the building block, and a power and control interface on the chassis for receiving power for the building block.

7 Claims, 8 Drawing Sheets

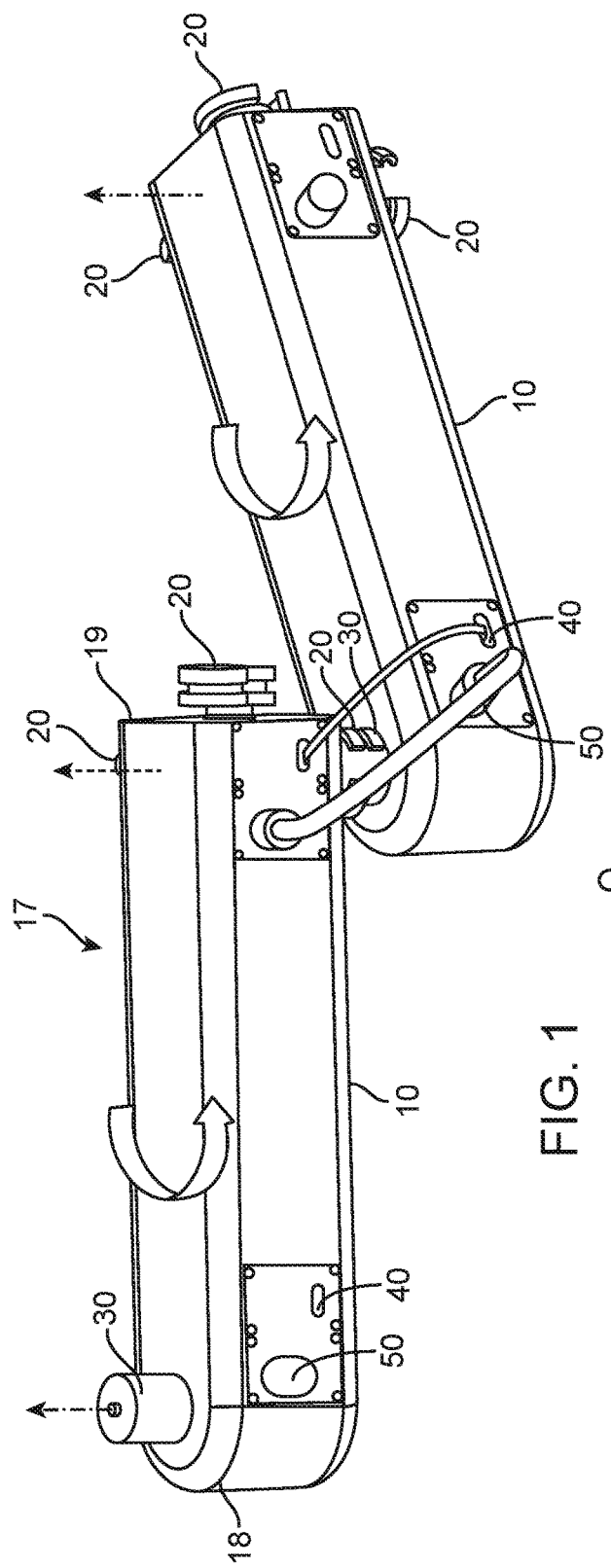
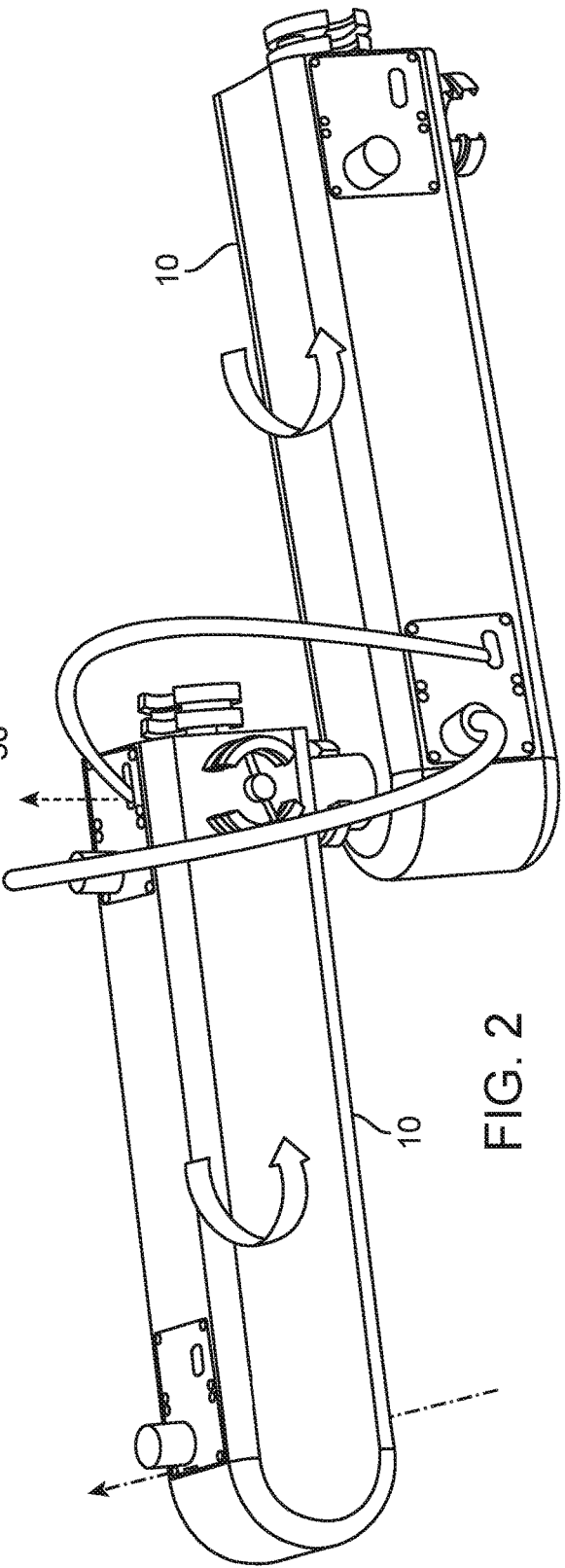
FIG. 1
FIG. 2

MODULAR ROBOTIC SYSTEM AND ASSOCIATED METHOD OF AUTOMATICALLY DETERMINING CONFIGURATION AND CONTROL THEREFOR

RELATED APPLICATION(S)

This application claims the benefit and priority of U.S. Provisional Patent Application No. 62/635,331 filed on Feb. 26, 2018, the content of which is incorporated by reference herein.

BACKGROUND

Robotic systems are often designed for specific tasks or processes, thus often requiring custom and complicated designs for long processes or tasks that involve many different movements. However, the custom designing of robots has certain drawbacks. For example, each design is often unique, and requires significant time, effort, and resources. Also, the control processes for each must be laboriously determined on an individual basis.

SUMMARY

In one aspect, the inventive concept pertains to a building block for a robotic system that includes a chassis having a first end and a second end, a first connector positioned closer to the second end than the first end of the chassis, either a second connector or a rotational actuator positioned closer to the first end than the second end of the chassis and configured to couple with the first connector, a signal interface on a surface of the chassis, the signal interface including hardware and circuitry for transferring and receiving signals from and to the building block, and a power and control interface on the chassis for receiving power for the building block.

In another aspect, the inventive concept pertains to a computer-implemented method of planning a robotic system using building blocks. The method comprises obtaining a plurality of building blocks described above, determining a specification for a robotic system including kinematic specifications and dynamic specifications, determining type and number of building blocks for a configuration of the specification, verifying that the configuration satisfies the kinematic specifications, and verifying that the configuration satisfies the dynamic specifications.

BRIEF DESCRIPTION OF THE DRAWINGS

For a better understanding of the invention, reference should be made to the following detailed description taken in conjunction with the accompanying drawings, in which:

FIG. 1 is an isometric view illustrating one connection of two robotic modules configured according to embodiments of the present invention;

FIG. 2 is an isometric view illustrating another connection between two robotic modules configured according to embodiments of the present invention;

Like reference numerals refer to corresponding parts throughout the drawings.

DETAILED DESCRIPTION

Figure 3:
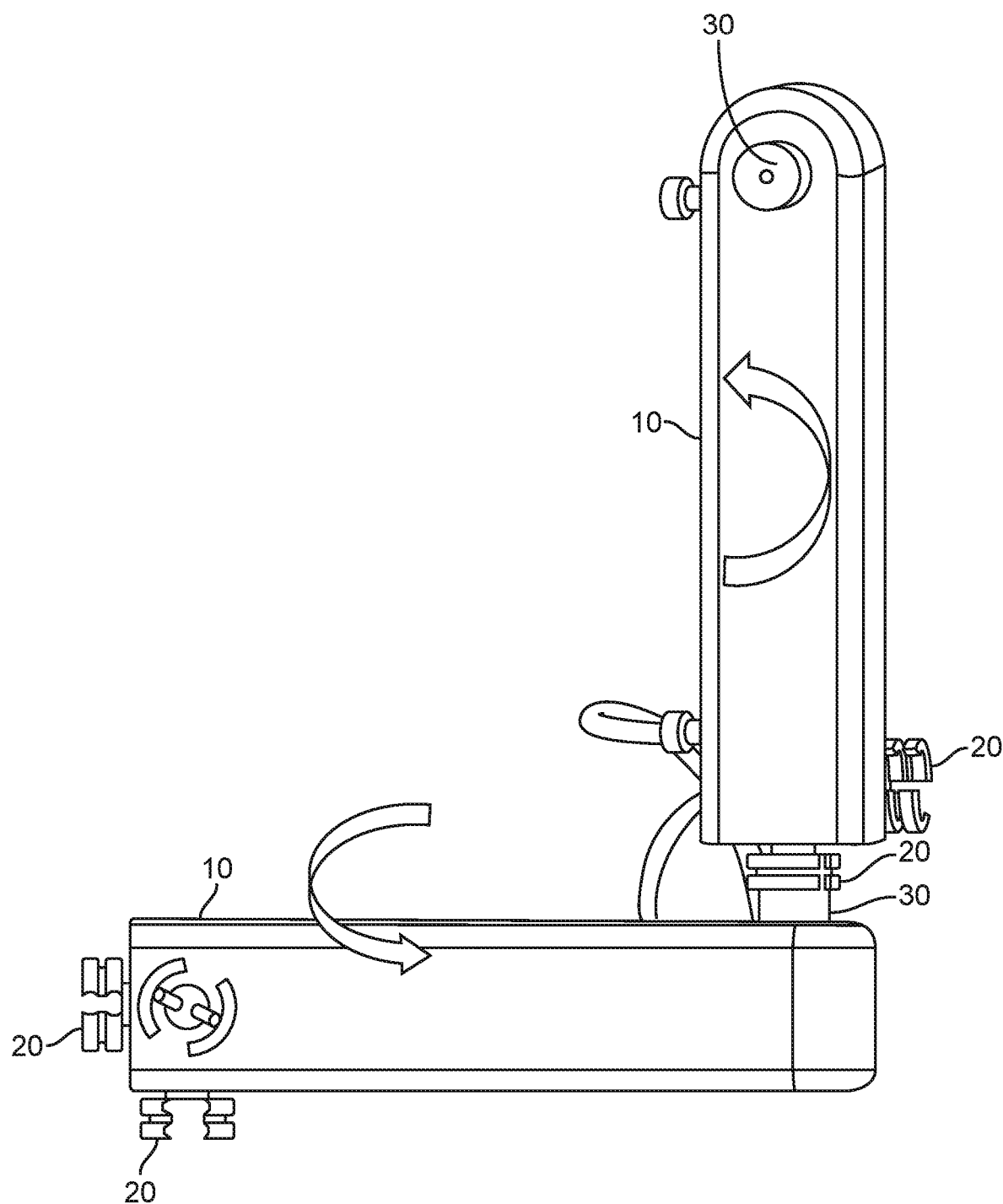
FIG. 3 is a side view illustrating another connection between two robotic modules configured according to embodiments of the present invention.

The various Figures are not necessarily to scale. All numerical values are approximate, and may vary. All examples of specific elements as well as their materials and compositions are to be taken as nonlimiting and exemplary only. Other suitable items, materials and compositions may be employed instead.

In one embodiment, the invention involves a modularly constructed robotic system. A set of standardized modules can be used to more easily construct robots meeting various specifications. The modules can include a rotational actuation module, a linear actuation module, and a spacer module. Each module has one or more standardized connectors allowing it to be connected to any other module. The connectors include interfaces for mechanical coupling, electrical power, and various signals. Given the fact that the constituent modules of a robot have known dimensions, specifications, and behavior, the configuration of a robot can be automatically determined once the performance requirements and specifications are known. Additionally, the control equations of the robot can be automatically determined once the configuration of the robot is known.

In one embodiment, a robotic system includes a base and a number of standardized modules that are connected to each other. The base provides a fixed point in space, and the modules are connected end to end from the base, to be chained together to form a robot. Each module is movable, so that they collectively form a robot capable of actuation. The modules are selected and placed/connected so as to be capable of specified movements.

The various modules and their interconnections are explained herein. FIG. 1 is an isometric view illustrating one connection of two robotic modules configured according to embodiments of the present invention. Here, modules 10 are standardized (in this embodiment, identical) modules that each have a number of connectors 20, a rotational actuator 30, a signal interface 40, and a power and control interface 50.

Each module 10 is substantially identical, e.g. each has substantially the same physical dimensions and properties (weight, materials, etc.). Each module 10 has a chassis 17 having a first end 18 and a second end 19, and connectors 20 each placed at the second end 19 of the chassis 17. In one embodiment, there may be three connectors 20 positioned on different surfaces of the chassis 17, each facing a different direction. In some embodiments, the three directions may be orthogonal to each other, although this need not necessarily be the case, and any directions are contemplated. If the chassis 17 is constructed as a cuboid shape, the connectors 20 can be placed at one end (e.g., the second end 19) and two adjacent sides, as shown in FIG. 1. The connectors 20 are standardized connectors that rotationally couple to the rotational actuator 30 of another module 10, so that the rotational actuator 30 can rotate the connector 20 (and thus its module 10).

The rotational actuator 30 includes a rotational motor that rotates about the axis shown by the dotted line of FIG. 1. The actuator 30 may be any actuator, such as a stepper motor or the like, that is capable of specified degrees of rotational motion according to power and control signals supplied through the power and control interface 50. When a connector 20 of one module 10 is connected to the rotational actuator 30 of another module 10, such as shown in FIG. 1, the rotational actuator 30 may rotate so as to rotate the module 10 connected to its connector 20, by a specified amount. For example, as shown in FIG. 1, when the rotational actuator 30 of the rightmost module 10 is connected to the bottommost connector 20 of the leftmost module 10, the actuator 30 may rotate the leftmost module 10 about its axis in the direction shown by the arrow.

The signal interface 40 may be any interface, standardized or otherwise, that allows for transmission of signals from any sensors that may be placed on or in any of the modules 10. Any of the modules 10 may have sensors, and each module 10 may contain sensor signal communication hardware sufficient to transfer signals from every module 10 to a central unit such as the base. For example, each module 10 may include circuitry for implementing a bus system, so that connected modules 10 have every one of their sensors connected through signal interfaces 40 to form a single bus system transmitting the output of every sensor to be output through the signal interface 40 of the module 10 connected to the base. Adjacent interfaces 40 may be connected by cable, as shown.

The power and control interface 50 of each module 10 may be any interface, standardized or otherwise, that allows for transmission of power to each rotational actuator 30 and control signals for controlling their actuation. In some embodiments, each module 10 may contain one or more power lines switchably connected to its rotational actuator 30, a controller controlling the switch, and a control line connected to the controller and relaying control signals for instructing the controller as to control of the actuator 30. The controller and control line may be implemented as, for example, a bus system, so that connected modules 10 have every one of their actuators 30/controllers connected through interfaces 50 to form a single bus system transmitting control signals to the actuator 30 of each module 10, and if desired relaying feedback from each actuator 30. Control signals and feedback would thus be input/output through the power and control interface 50 of the module 10 connected to the base. Adjacent interfaces 50 may be connected by cable, as shown.

In this manner, a succession of modules 10 may be connected to each other via their connectors 20 and rotational actuators 30, to effectively "chain together" multiple modules 10 and form a robot capable of motion in many different degrees of freedom. As shown in FIG. 1, two modules 10 can be connected so that each module 10 rotates about its bottommost connector 20/actuator 30, i.e. each module 10 rotates about its respective axis indicated by its dotted arrow.

As can be observed, the connection configuration of FIG. 1 is not the only manner by which two modules 10 may be connected. FIG. 2 is an isometric view illustrating another connection between two robotic modules configured according to embodiments of the present invention. Here, the leftmost module 10 is connected to the rightmost module 10 via a different connector 20 than in FIG. 1, so that the rotational actuator 30 of the leftmost module 10 rotates about the leftmost dashed axis, as shown. In this manner, the leftmost module 10 may rotate about the same rightmost dashed axis as in FIG. 1, but any other module 10 connected to the leftmost module 10 will rotate about the leftmost dashed axis, rather than about the vertical axis of FIG. 1.

FIG. 3 is a side view illustrating another connection between two robotic modules configured according to embodiments of the present invention. Here, the upper module 10 is connected to the lower module 10 via its rear-facing connector 20, so that the robotic system rotates the upper module 10 about its major axis, in the direction shown. In turn, the rotational actuator 30 of upper module 10 may carry out rotation about an axis roughly normal to the plane of FIG. 3. The lower module 10 may also be connected to another module 10 in any of the three directions corresponding to its three connectors 20, so that it may be rotated about any of the axis of its three connectors 20.

Figure 4:
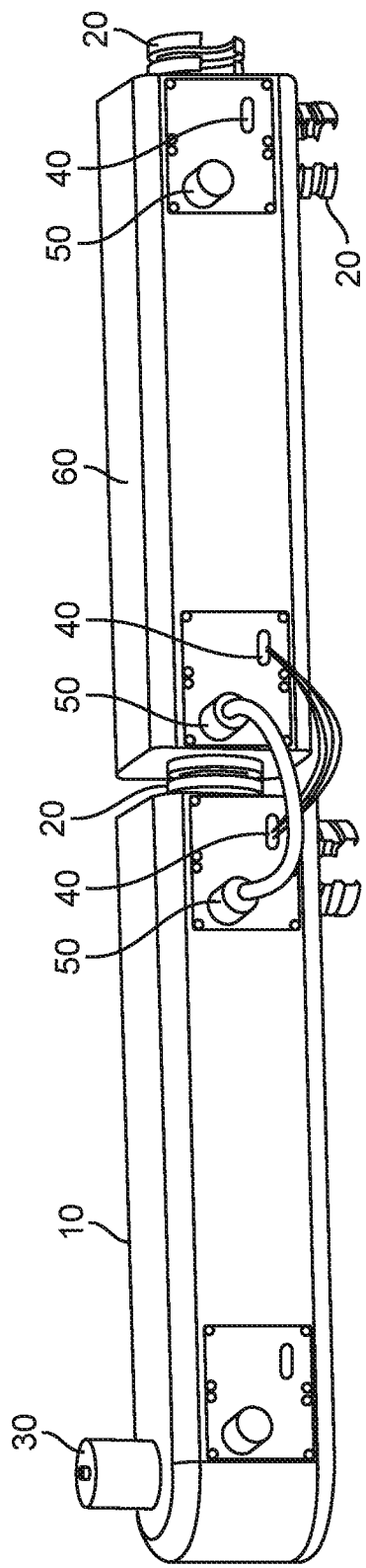
FIG. 4 is an isometric view illustrating a connection between two robotic modules configured according to embodiments of the present invention, where one module is a spacer module.

Embodiments of the invention also utilize other modules in addition to the rotational modules 10 described above. For example, robotic systems may also employ spacer modules and linear actuation modules. FIG. 4 is an isometric view illustrating a connection between two robotic modules configured according to embodiments of the present invention, where one module is a spacer module. Here, spacer module 60 is similar to the above described module 10, except for the absence of a rotational actuator 30 and its associated circuitry and the presence of a connector 20 in its place (the connector 20 extending from the leftmost end of module 60 in the view of FIG. 4). That is, spacer module 60 does not have the ability to rotate another module 10, but instead simply provides mechanical spacing and conveys electrical signals and power. A cable simply relays power and signals between the two power and control interface 50 of module 60, and another relays signals between the two signal interfaces 40. That is, the two interfaces 50 of module 60 are electrically connected to each other, as are the two interfaces 40, so that signals and power are simply passed through module 60 unchanged. Module 60 thus acts simply as an electrical relay and mechanical spacer. If the presence and location of the spacer module 60 relative to other modules 10 is to be conveyed, such as for automatic generation of control equations or processes, the spacer module 60 may also contain circuitry relaying the presence and/or relative location of module 60 through connectors 40 or 50.

Figure 5:
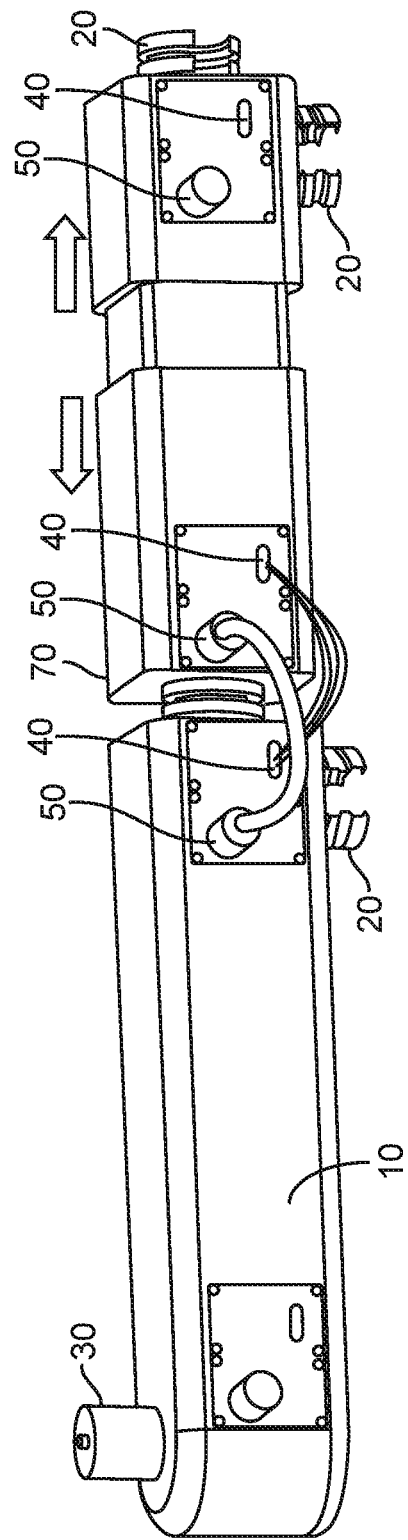
FIG. 5 is an isometric view illustrating a connection between two robotic modules configured according to embodiments of the present invention, where one module is a linear actuation module.
Figure 6:
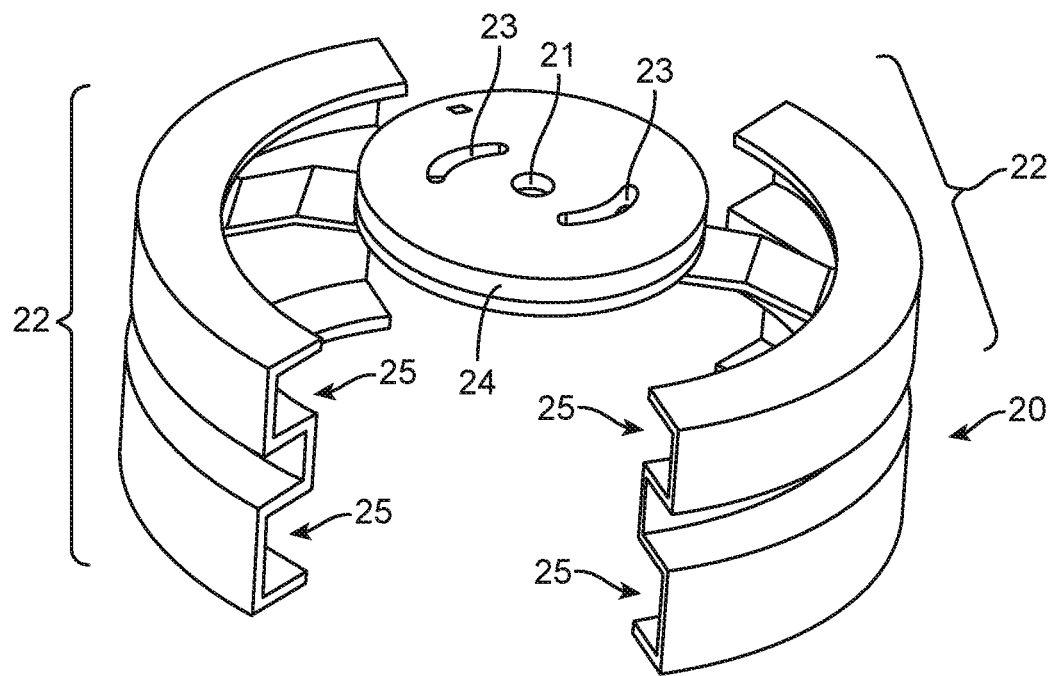
FIGS. 6, 7, 8, and 9 are views illustrating a coupling mechanism for connecting two robotic modules configured according to embodiments of the present invention.
Figure 7:
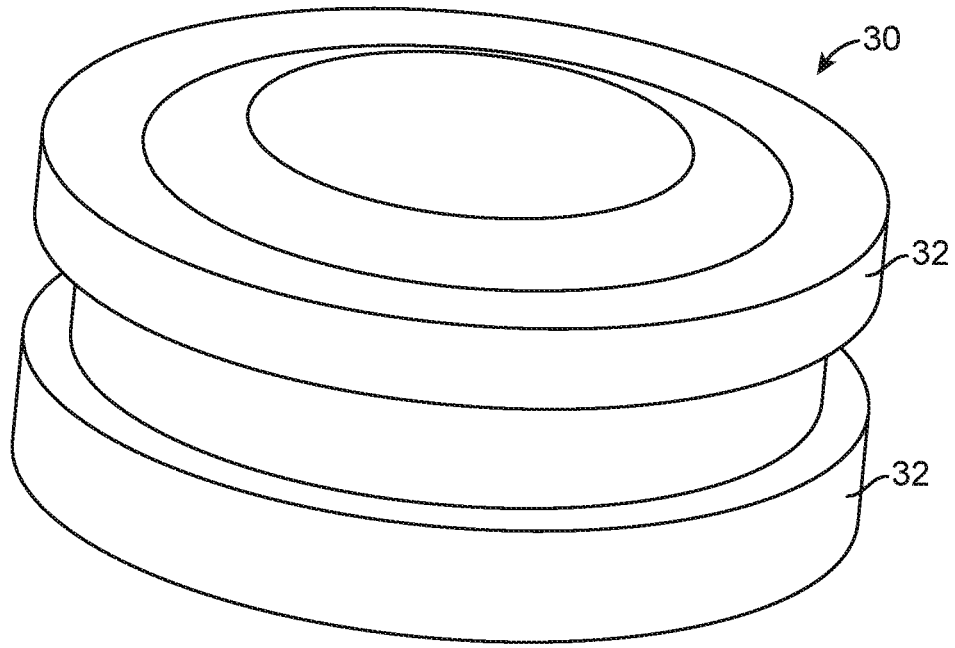

FIG. 5 is an isometric view illustrating a connection between two robotic modules configured according to embodiments of the present invention, where one module is a linear actuation module. Here, linear actuation module 70 has connectors 20 and interfaces 40, 50 as with other modules 10 and positioned as shown, but does not have a rotational actuator 30. Instead, linear actuation module 70 has an internal linear actuation mechanism (such mechanisms are known) capable of extending or retracting the opposing ends of the module 70 in the directions of the arrows shown. That is, the module 70 is capable of extending or retracting along its major axis. The module 70 has three connectors 20 at its rightmost end, similar to modules 10 as described above. Module 70 also has another connector 20 at its leftmost end, for coupling to another module 10, 60, 70. Here, module 70 is shown as being coupled to a rotational module 10. The module 70 may contain within it any linear actuation mechanism desired, and control circuitry therefor, allowing the module 70 to extend or retract according to signals sent to its controller via its interface 50.

In addition, as with other modules 10, 60, module 70 contains similar circuitry and wiring for transmitting power and signals to and from other modules 10, 60, 70 via its interfaces 40, 50.

FIGS. 6-9 are views illustrating a coupling mechanism for connecting two robotic modules configured according to embodiments of the present invention. In particular, further details of connectors 20 are given. The connectors 20 have two arms 22 that retract radially inward toward the circular base 24, to clamp onto the outer edges of rotational actuator 30. The circular base 24 is rotatably attached to its module 10, 60, 70 by three pins or screws that extend through the holes shown in base 24. In particular, one pin extends through the central hole 21 in base 24 to rotatably fix the circular base 24 to a fixed point on the surface of module 10, 60, 70. Two other pins extend through the curved slots 23 to each side of the central hole 21, so that rotation of base 24 about the central hole moves the pins through their slots, radially retracting or extending arms 22. In this manner, connector 20 may be twisted or rotated so as to securely clamp onto the corresponding rotational actuator 30. In alternative embodiments, arms 22 may be securely clamped onto their actuators 30 by any other mechanism, e.g. a tool may be required or used to clamp the arms 22, the arms 22 may snap lock onto actuators 30, or the like. Any method of secure and non-slip coupling between arms 22 and actuators 30 is contemplated.

Figure 8:
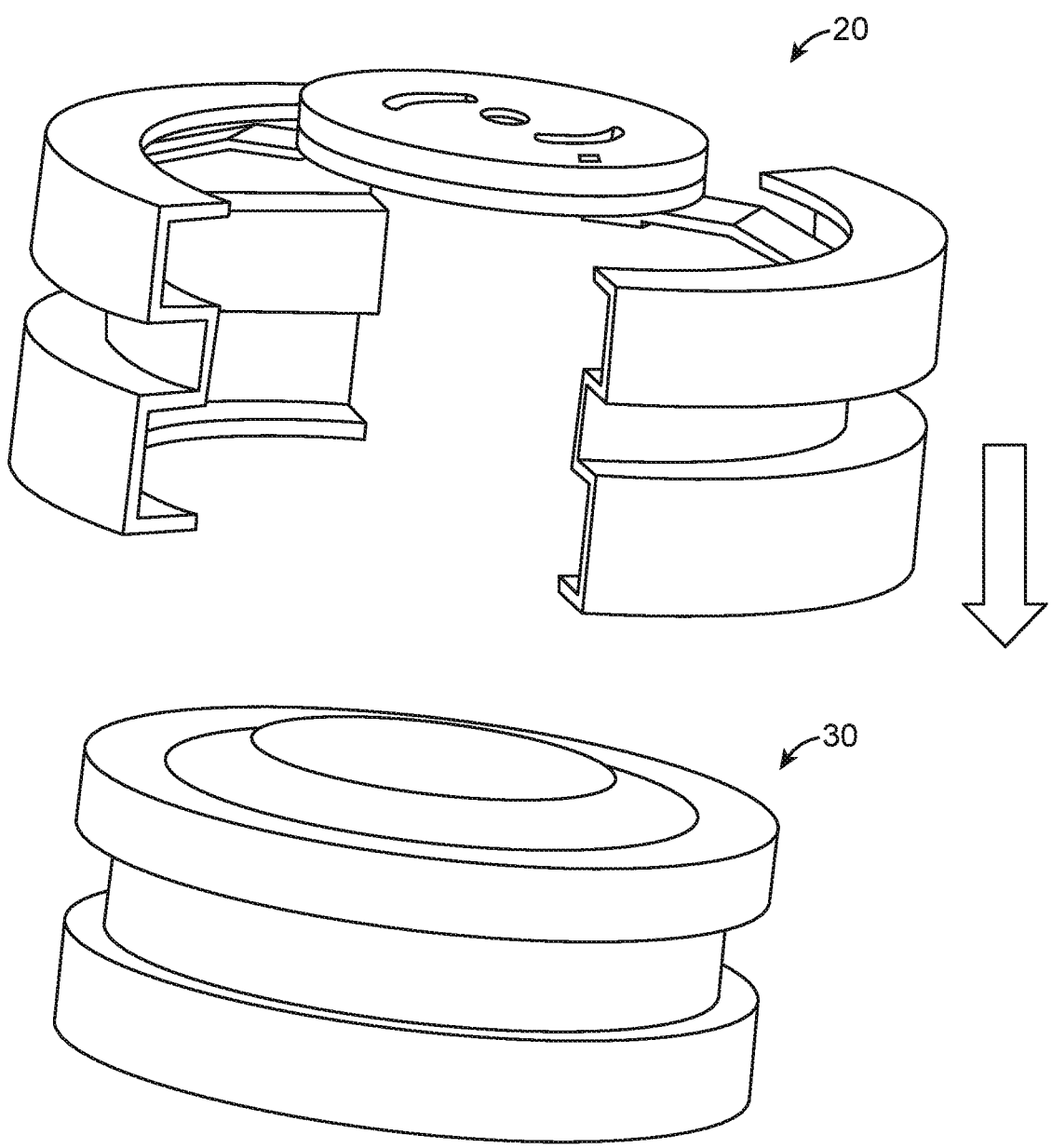
Figure 9:
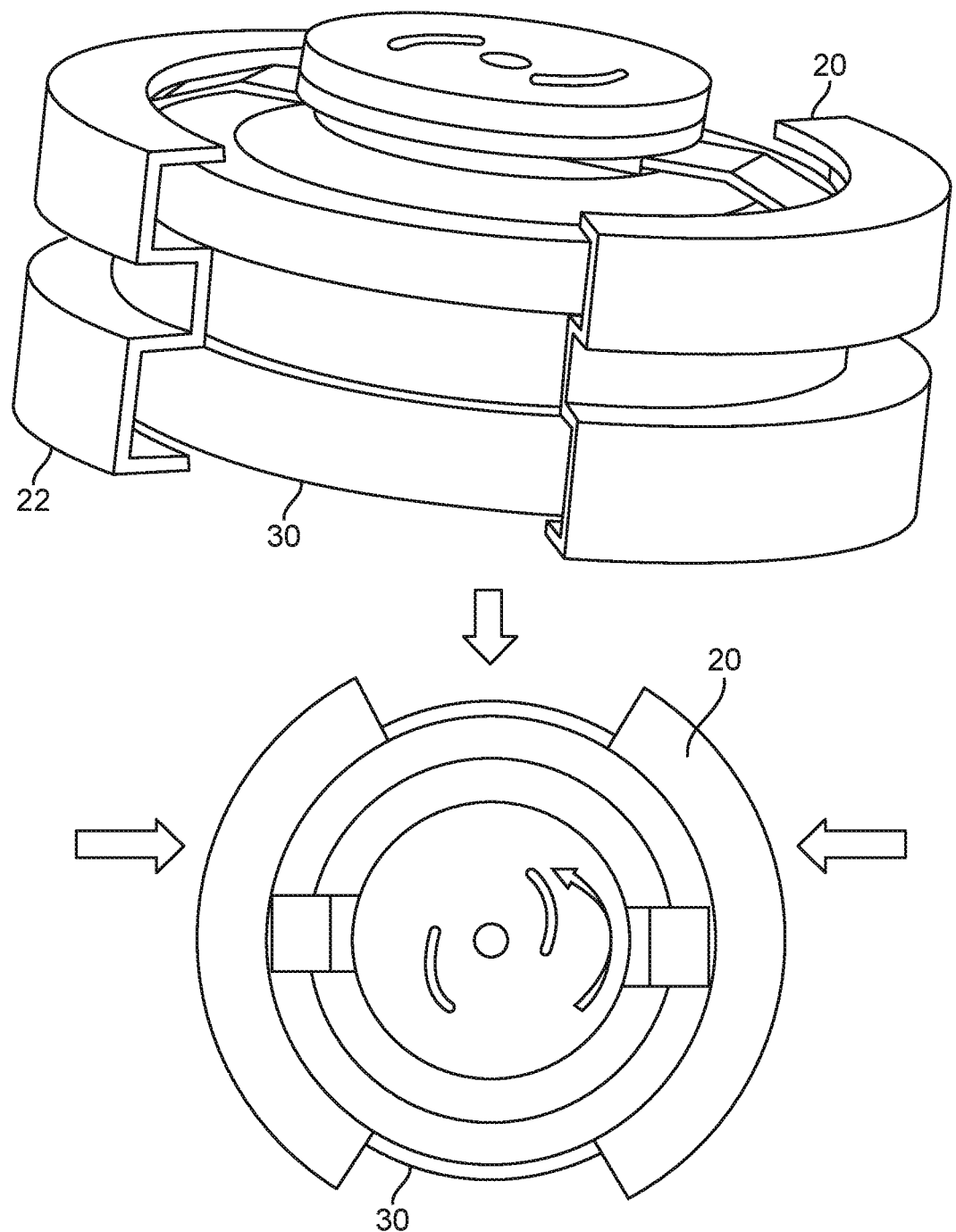

In operation, two modules 10, 60, 70 are positioned so that the arms 22 of a desired connector 20 are over a corresponding actuator 30, as shown in FIG. 8. The modules 10, 60, 70 are then moved so that the arms 22 are positioned around the outer edge of actuator 30, with flanges 32 of actuator 30 lining up with grooves 25 in arms 22, as shown in FIG. 9. The arms 22 are then clamped onto the flanges of actuator 30, as above. Clamping is sufficiently secure to permit actuator 30 to rotate the module 10, 60, 70 of the connector 20 without slippage.

It can be observed that the above modules 10, 60, 70 provide a set of standardized modules from which an arbitrary robotic system can be constructed. That is, embodiments provide a standardized set of parts from which a robot may be more easily constructed, as compared to conventional robotic systems that are often constructed using custom parts specially fabricated for that particular robot. Embodiments of the invention thus prevent the need to design and build different, custom parts for every new robot, instead allowing new robots to be built more easily from a standardized set of modules. Any number of modules 10, 60, 70 may be used according to the requirements of any particular application, and as above these modules 10, 60, 70 may be connected to each other in numerous different ways, allowing for creation of robotic systems that satisfy a wide range of specifications using only a relatively small number of standardized module designs.

Figure 10:
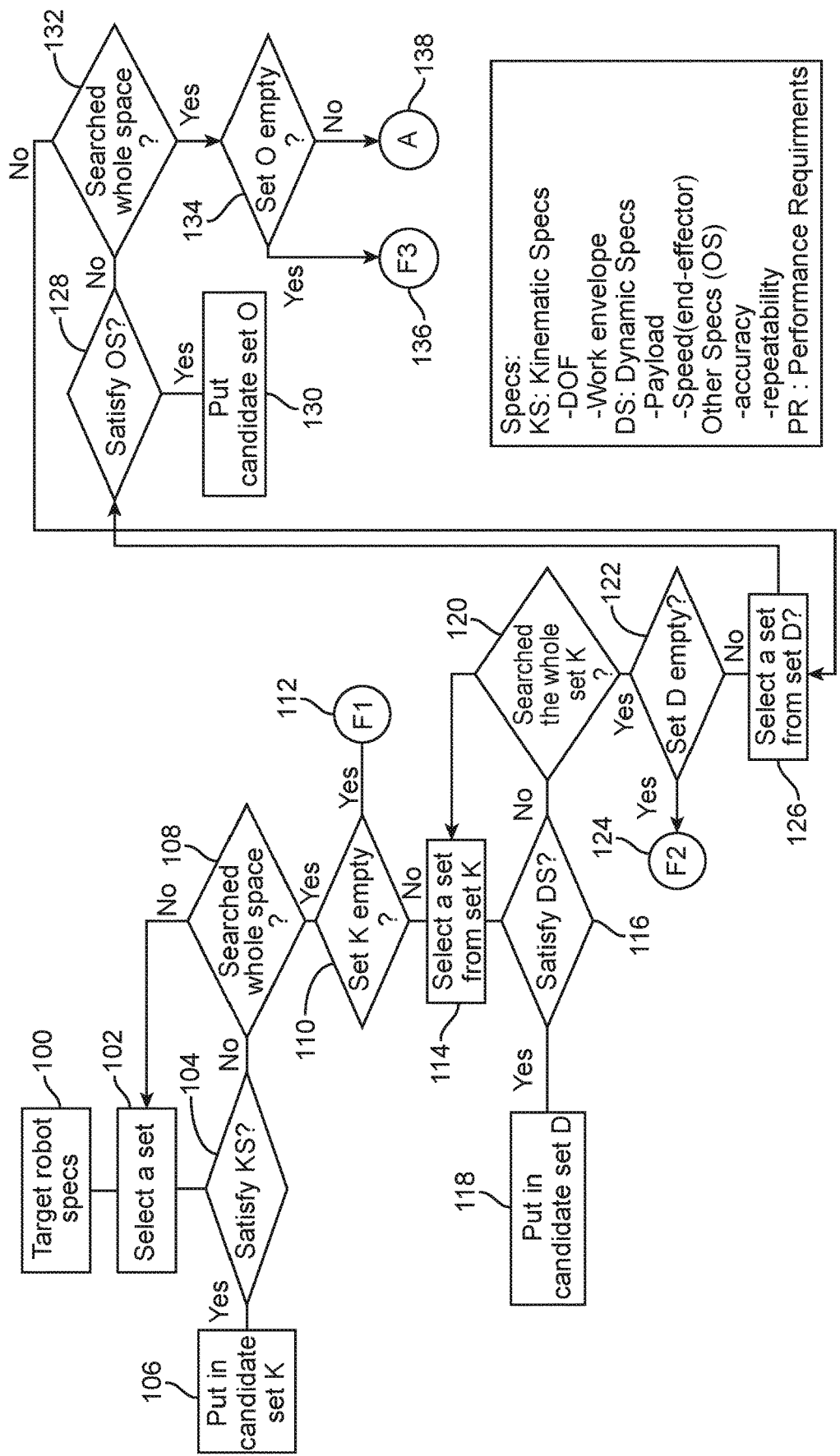
FIG. 10 is a flowchart illustrating process steps in automatically determining the configuration of a robotic system.

Embodiments also allow for easier design of such robots, given known specifications. FIG. 10 is a flowchart illustrating process steps in automatically determining the configuration of a robotic system. First, the specifications for a desired robot are determined (Step 100). These specifications are any specifications used in design of any robot, and can be categorized as kinematic specifications (KS), dynamic specifications (DS), other specifications (OS), and performance requirements (PR). Exemplary kinematic specifications generally describe the physical locations that the robot must be able to reach, and may include degrees of freedom required, the overall work envelope, etc. exemplary dynamic specifications generally describe the dynamic performance that the robot must be able to achieve, and may include the total payload (weight or mass to be carried), end-effector speed, and the like. Other specifications may be any other system specifications, and may for example include accuracy, repeatability, etc. Performance requirements may be any other requirements, e.g. cost, chemical resistance, etc. The process of FIG. 10 does not generally include PR considerations, on the assumption that they are already factored into the set selection of Step 102.

Once the specifications are determined in Step 100, a set of candidate robot configurations is entered (Step 102). These configurations may or may not satisfy the remaining specifications, and may be entered into a computer implemented database by a human user, or may be automatically generated in any manner. The configurations may be generated as a simple list of all possible robot designs that can be created using a specified number of modules 10, 60, 70, which may be determined automatically as is known, or which may be manually entered.

Next, it is determined whether each configuration entered in Step 102 satisfies the kinematic specifications KS (Step 104). Methods of accomplishing this determination are known, and may involve performing known kinematic analysis of each candidate configuration, using the known kinematic properties (e.g. spatial dimensions, degrees of freedom, etc.) of each standardized module 10, 60, 70 and how each candidate configuration specifies their layout. Every candidate configuration which satisfies KS is placed in a candidate set K (Step 106), so that K represents the subset of all those configurations entered in Step 102 which satisfies KS. Once this determination is made for every candidate configuration of Step 102 (Step 108), a check is made to determine whether set K is empty or not, i.e. whether no candidate robot configurations satisfy KS (Step 110). If this set K is empty, failure mode 1 (F1) is returned (Step 112), indicating to the user that no candidate robot configuration is capable of satisfying the required kinematic specifications. In this instance, the user may be allowed to return to Step 102 and enter a new set of candidate robot configurations, or the process may simply terminate.

If set K is not empty, i.e. if at least one candidate robot configuration satisfies KS, the configurations of set K may be selected one by one (Step 114) to determine whether they satisfy the dynamic specifications DS (Step 116). Methods of accomplishing this determination are known, and may involve performing known dynamic analysis of each candidate configuration, using the known dynamic properties (e.g. spatial dimensions, mass, torque, extension/retraction force, degrees of freedom, etc.) of each standardized module 10, 60, 70 and how each candidate configuration specifies their layout. Each candidate in set K which also satisfies DS is placed in set D (Step 118), so that D represents the subset of set K which satisfies DS. A check is made whether every configuration of set K has been analyzed (Step 120), so that each configuration of set K is analyzed. Once every candidate in set K has been analyzed to determine whether it satisfies DS, a check is made to determine whether set D is empty or not (Step 122), i.e. whether no candidate of set K satisfies DS. If none does, failure mode 2 (F2) is returned (Step 124), flagging to the user that while at least one entered candidate configuration satisfies KS, no candidate robot configuration also satisfies the dynamic specifications DS. In this instance, the user may be allowed to return to Step 102 and enter a new set of candidate robot configurations, or the process may simply terminate.

If set D is not empty, the configurations of set D may be selected one by one (Step 126) to determine whether they satisfy the other specifications OS (Step 128). This determination may be carried out by, for example, performing a statistical, best case/worst case, or minimum/maximum analysis using known performance parameters and tolerances for each standardized module 10, 60, 70. Any analysis, carried out in any manner, is contemplated. Each configuration of set D which also satisfies OS is placed in set O (Step 130), so that set O represents the subset of set D whose candidates also satisfy OS. The set D is checked to determine whether every configuration in set D has been evaluated to determine whether it satisfies OS (Step 132). If not, the process returns to Step 126 until every configuration of set D is evaluated against OS. Once all of set D has been evaluated against OS, a check is made to determine whether set O is empty or not (Step 134). If it is, failure mode 3 (F3) is returned (Step 136), indicating to the user that no entered candidate configuration satisfies all of the other specifications OS. Alternatively, if at least one configuration satisfies OS (Step 138), then at least one configuration satisfies all required specifications KS, DS, OS.

Figure 11:
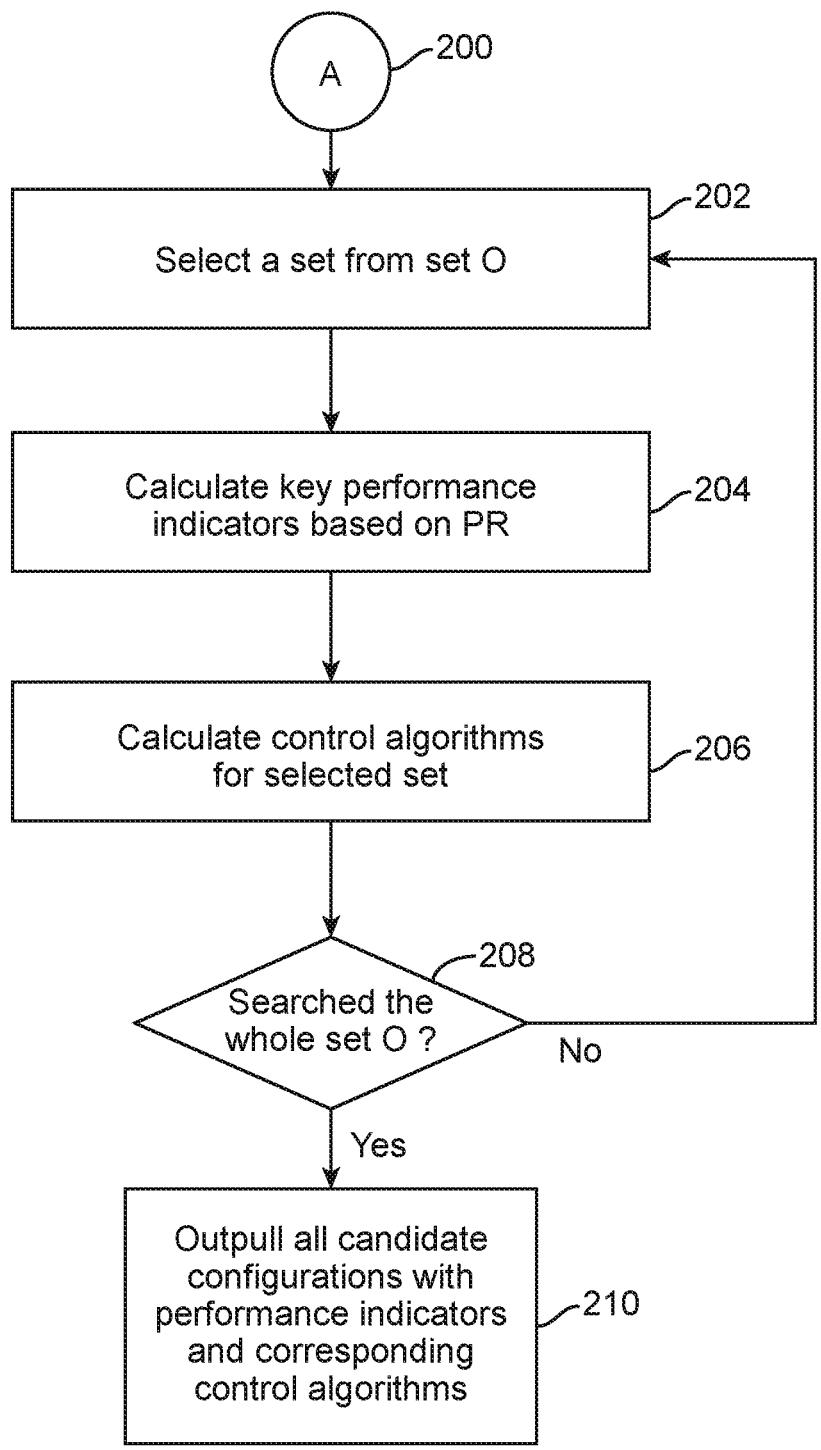
FIG. 11 is a flowchart illustrating process steps in automatically determining control equations for a configured robotic system.

Such "successful" configurations may then be evaluated to determine the equations governing their behavior, so that computer-implemented control may be carried out for robots constructed according to these configurations. FIG. 11 is a flowchart illustrating process steps in automatically determining control equations for a configured robotic system. Once Step 138 is completed and a set O with at least one candidate robot configuration has been determined (Step 200), the configurations of set O are selected (Step 202) and key performance indicators are determined for the candidate configuration, as based on the performance requirements PR. Key performance indicators may be selected or determined by the user, for example. The control equations may then be determined for each candidate configuration (Step 206). Control equations may be determined in known manner, from the known and stored properties of each module 10, 60, 70 (e.g., dimensions, mass, forces generated, etc.). If every candidate in set O has not yet had its control equations determined, the process continues until it has (Step 208). The candidate configurations of set O are then output along with their determined control equations and key performance indicators (Step 210). Each of these configurations may then be constructed and connected to a computer-based control system via the interfaces 40, 50 of the module connected to the base, in known manner, so as to control the constructed robot.

The computer-based control system may be any system capable of computer control of a robot. For example, a laptop or desktop computer may store thereon executable software modules programmed to carry out the above robot configuration selection and control equation determination processes, as well as software for carrying out real-time control of such robots under the direction of a user.

In summary, embodiments of the present invention provide a library of standardized and modular robot components from which many different robot configurations may be built. The library includes at least a rotational actuation module, a linear actuation module, and a spacer module. A robot of any size, and capable of both rotation and linear movement, may thus be built from an appropriate combination of these modules. Additionally, as the physical properties of each module are standardized, many different configurations of robots may be entered and their behavior automatically determined. In this manner, robot configurations that satisfy predetermined criteria may be automatically generated and controlled.

The embodiments were chosen and described in order to best explain the principles of the invention and its practical applications, to thereby enable others skilled in the art to best utilize the invention and various embodiments with various modifications as are suited to the particular use contemplated. Additionally, different features of the various embodiments of the present invention, disclosed or otherwise, can be mixed and matched or otherwise combined so as to create further embodiments contemplated by the invention.

What is claimed is:

1. A building block for a robotic system, comprising:
    a chassis having a first end and a second end;
    a connector positioned closer to the second end than the first end of the chassis;
    a rotational actuator positioned closer to the first end than the second end of the chassis and configured to couple with the connector;
    a signal interface on a surface of the chassis, the signal interface including hardware and circuitry for transferring and receiving signals from and to the building block; and
    a power and control interface on the chassis for receiving power for the building block.

2. The building block of claim 1, wherein the connector is a first connector, further comprising a second connector and a third connector, wherein the first connector, the second connector, and the third connector face orthogonal directions with respect to one another.

3. The building block of claim 1, wherein the connector comprises:
    a circular base rotatably attached to the chassis;
    retractable arms connected to the circular base, the retractable arms configured to adjust their distances from the circular base and configured to wrap around the rotational actuator.

4. The building block of claim 3, wherein the retractable arms comprise grooves and the rotatable actuator comprise flanges, such that the flanges fit into the grooves when connector engages with the rotatable actuator.

5. A building block for a robotic system, comprising:
    a chassis having a first end and a second end;
    a first connector positioned closer to the second end than the first end of the chassis;
    a second connector positioned closer to the first end than the second end of the chassis and configured to couple with the first connector;
    a signal interface on a surface of the chassis, the signal interface including hardware and circuitry for transferring and receiving signals from and to the building block; and
    a power and control interface on the chassis for receiving power for the building block.

6. The building block of claim 5, further comprising an internal linear actuation mechanism that moves the first end and the second end closer to each other and farther from each other.

7. A computer-implemented method of planning a robotic system using building blocks, comprising:
    obtaining a plurality of building blocks, wherein each of the building blocks has:
        a chassis having a first end and a second end;
        a first connector positioned closer to the second end than the first end of the chassis;

either a rotational actuator or a second connector positioned closer to the first end than the second end of the chassis and configured to couple with the first connector;

a signal interface on a surface of the chassis, the signal interface including hardware and circuitry for transferring and receiving signals from and to the building block; and a power and control interface on the chassis for receiving power for the building block; and determining a specification for a robotic system including kinematic specifications and dynamic specifications;

determining type and number of building blocks for a configuration of the specification;

verifying that the configuration satisfies the kinematic specifications; and verifying that the configuration satisfies the dynamic specifications.

\* \* \* \* \*